June 22, 1965 B. LEMANSKI 3,190,361
BEAN PULLERS
Filed Nov. 21, 1961

INVENTOR.
Bernard Lemanski
BY
Fearman, Fearman &
McCulloch.
ATTORNEYS

United States Patent Office 3,190,361
Patented June 22, 1965

3,190,361
BEAN PULLERS
Bernard Lemanski, 308 Silver St., Bad Axe, Mich.
Filed Nov. 21, 1961, Ser. No. 154,933
3 Claims. (Cl. 171—83)

This invention relates to agricultural implements and more specifically to a bean cutting apparatus provided with means for severing two rows of beans simultaneously.

One of the prime objects of the invention is to design simple, practical, and substantial blade holding shoes which can be readily attached to the beam of an agricultural implement for severing the stalks of ripe bean plants, and which will leave the ground in a smooth, loosened condition.

Another object is to provide a bean cutting apparatus having readily detachable blades, angularly disposed with relation to each other and to the rows of plants, which blades can be easily removed for sharpening or replacement without use of special tools and in a minimum length of time.

A further object is to design a bean cutting apparatus in which the loosened, displaced ground flows smoothly over the blades and shoes when the device is in operation, and which is provided with means on the shoes for directing the flow of dirt in predetermined directions.

Still a further object is to provide an improved attachment for the class of machines commonly referred to as bean cutting apparatus, which easily and cleanly severs the bean stalks at a point just below the ground level, so that the severed stalks can be readily gathered and stacked preparatory to threshing or otherwise disposing of the stacks.

A further object still is to provide bean severing shoes and blades which can be readily manufactured and assembled and which can be mass produced with the savings incident thereto.

With the above and other objects in view, the present invention consists in the combination and arrangement of parts, hereinafter more fully described, illustrated in the accompanying drawing, and more particularly pointed out in the appended claims; it being understood that changes may be made in the form, size, proportion and minor details of construction, without departing from the spirit, or sacrificing any of the advantages of the invention.

Figure 1:
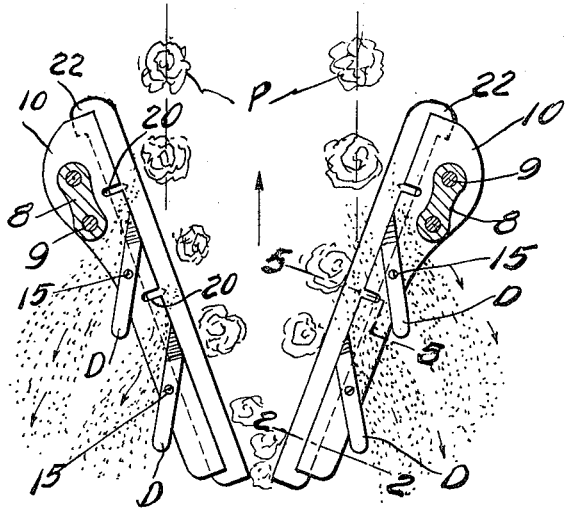
FIGURE 1 is a top plan view showing a pair of shoes and blades operating on two rows of plants, and showing also the dirt flow over said shoes.
Figure 2:
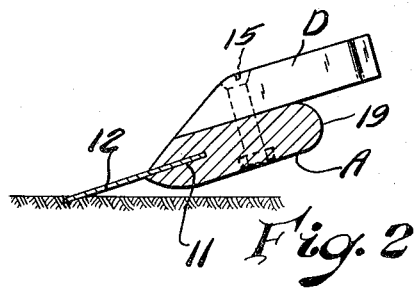
FIGURE 2 is an enlarged, transverse, sectional view taken on the line 2—2 of FIGURE 1.
Figure 3:
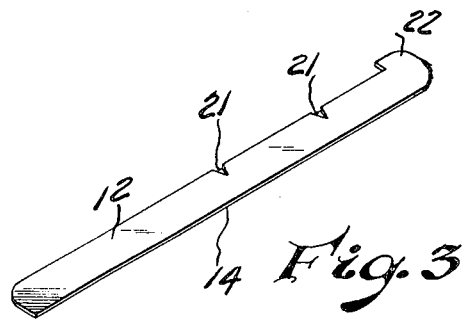
FIGURE 3 is a perspective view of one of the cutting blades.
Figure 4:
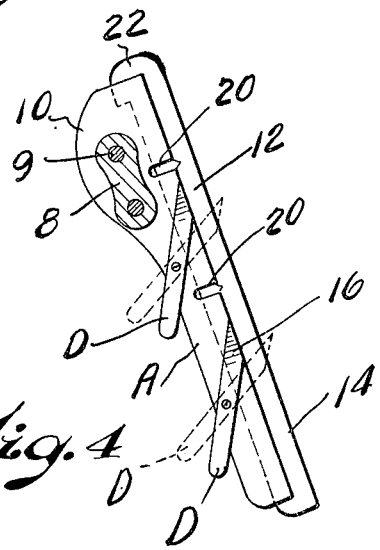
FIGURE 4 is a plan view of one of the shoes, the broken lines illustrating the adjustability of the deflectors.
Figure 5:
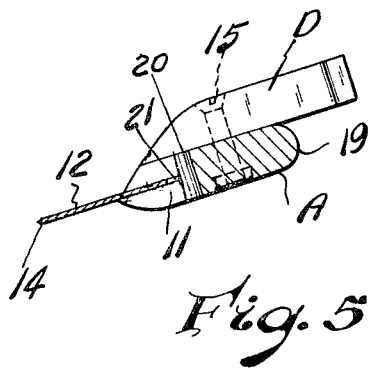
FIGURE 5 is a view similar to FIGURE 2 taken on the line 5—5 of FIGURE 1.
Figure 6:
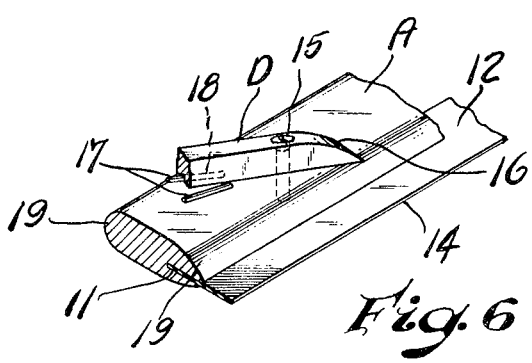
FIGURE 6 is an enlarged, fragmentary, perspective view illustrating the means for holding the deflectors in set position.

Referring now more particularly to the accompanying drawing in which I have shown one embodiment of my invention, letters A—A indicate a pair of elongated shoes, attached to standards 8 of the apparatus by means of bolts 9 or in any other approved manner, the front end section of the shoe being slightly enlarged and rounded as at 10 to provide a rigid, stable connection, and the inner edge of each shoe being grooved from end to end as at 11, to accommodate a relatively thin blade 12, the exposed edge of which is sharpened to form a cutting edge 14. These shoes are disposed at a predetermined angle with relation to the surface of the ground and normally travel slightly below the surface for shearing the stalks of the plants P as the apparatus is operated on two rows of plants.

A plurality of relatively thin deflectors D are mounted on the top face of the shoes A—A by means of bolts 15, the front edge of each deflector being rounded as at 16 to prevent entanglement of the bean stalks thereon and small radially disposed ribs 17 being cast integral with the upper face of the shoes for engagement in a groove 18 provided in the bottom face of each deflector for holding it in set position. It will be noted that the blades are set at an angle so that they readily enter the dirt and travel at a set depth to sever the bean plants as the device is operated.

The front and back edges of the shoes A—A are rounded as at 19 so that in operation the dirt flows thereover in a sheet as the implement is operated (see FIG. 1 of the drawing), the deflectors preventing the dirt being hilled to form a ridge. The dirt can be deflected as wished by adjusting the deflectors to the angle desired.

Recessed pasages 20 are provided in the front edge of the shoes A—A and spaced apart, shouldered detents or depressions 21 are provided in the blades 12 the detents being so spaced that when the blades are in position in the shoe, they register with the recessed passages 20 in the shoes. The front end of each blade is hook-shaped as at 22, and the front end of the shoe is grooved in a shape to accommodate this hook, the outer end of each hook being rounded so that stones, vines or other debris is pushed aside. When these blades are pressed into the grooves 11, no further securing means is necessary, because as the implement is operated, the blades are continuously pressed tighter into the grooves.

The blades are interchangeable and when it is desired to remove a blade for sharpening or replacement, it is merely necessary to insert a screwdriver or other tool (not shown) in the groove and detent, and prying action against the body of the shoe will readily force the blade laterally to permit easy and quick removal.

Modifications can be made in the invention herein described, and it is intended that the matter contained in the accompanying specification shall be interpreted as illustrative only and not in a limiting sense.

In practice, the apparatus is powered by a tractor or other power means (not shown), and operates on two rows of plants simultaneously. The shoes 12 are disposed at an angle with relation to each other, diverging forwardly, and when the shoes are set, the cutting edges of the blades are disposed slightly below the surface of the ground, and as the apparatus travels over the rows, the bean stalks will be severed and pushed toward each other to form a single row of stalks.

From the foregoing description, it will be obvious that I have perfected very simple, practical, economical and inexpensive shoes for bean cutters and the like.

What I claim is:

1. Bean plant cutting apparatus for attachment to a mobile superstructure comprising: support means having a front face and a rear face and mounted to be moved forwardly along a pair of rows of plants; a pair of elongated shoes thereon, angularly disposed relative to one another and having their rear ends in converging relation; said shoes having laterally extending grooves in their confronting faces; and a relatively thin elongated blade removably received in each groove and having a hook-shaped front end disposed in overlapped relation to the front end of the shoe and extending laterally beyond the groove adjacent the front surface of the shoe to anchor the blade against rearward movement.

2. The combination defined in claim 1 in which said shoes have openings extending angularly to said grooves and communicating with the inner portions of said grooves, spaced along the length thereof to permit insertion of a tool to pry said blades laterally out of said grooves.

3. The combination defined in claim 1 in which the front outer side portions of said shoes are curved forwardly.

References Cited by the Examiner

UNITED STATES PATENTS

| | | | |
|---|---|---|---|
| 687,302 | 11/01 | Gaterman | 171—83 |
| 2,305,254 | 12/42 | Hirschkorn. | |
| 2,869,311 | 1/59 | Beeston | 56—295 |

T. GRAHAM CRAVER, *Primary Examiner.*

ANTONIO F. GUIDA, ARNOLD RUEGG, *Examiners.*